(12) United States Patent
Kang et al.

(10) Patent No.: US 9,767,588 B2
(45) Date of Patent: Sep. 19, 2017

(54) METHOD AND APPARATUS FOR IMAGE PROCESSING

(71) Applicant: Samsung Electronics Co., Ltd., Gyeonggi-do (KR)

(72) Inventors: Tae-hoon Kang, Gyeonggi-do (KR); Won-seok Song, Seoul (KR); Myung-kyu Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/843,324

(22) Filed: Sep. 2, 2015

(65) Prior Publication Data

US 2016/0140417 A1 May 19, 2016

(30) Foreign Application Priority Data

Nov. 18, 2014 (KR) ........................ 10-2014-0161159

(51) Int. Cl.
| | |
|---|---|
| *G06K 9/52* | (2006.01) |
| *G06T 11/60* | (2006.01) |
| *G06F 17/30* | (2006.01) |
| *G06T 3/00* | (2006.01) |
| *G06K 9/00* | (2006.01) |
| *G06K 9/20* | (2006.01) |
| *G06K 9/36* | (2006.01) |

(52) U.S. Cl.
CPC ........ *G06T 11/60* (2013.01); *G06F 17/30247* (2013.01); *G06K 9/00442* (2013.01); *G06K 9/2081* (2013.01); *G06T 3/0012* (2013.01); *G06K 2009/363* (2013.01); *G06T 2210/22* (2013.01)

(58) Field of Classification Search
CPC .... G06K 9/52; G06K 9/46; G06K 2009/4666; G06T 3/0012; G06T 11/60; G06F 17/30247

See application file for complete search history.

(56) References Cited

U.S. PATENT DOCUMENTS

| | | | | |
|---|---|---|---|---|
| 8,549,435 | B1 * | 10/2013 | Bushore | G06F 17/24 715/769 |
| 2005/0078192 | A1 | 4/2005 | Sakurai et al. | |
| 2005/0078200 | A1 | 4/2005 | Morichika | |
| 2009/0204915 | A1 * | 8/2009 | Yamagami | G06F 9/4443 715/764 |
| 2009/0208118 | A1 * | 8/2009 | Csurka | G06K 9/00664 382/228 |
| 2009/0262199 | A1 * | 10/2009 | Miyamoto | H04N 1/387 348/207.1 |
| 2010/0284043 | A1 | 11/2010 | Hattori | |
| 2011/0032570 | A1 | 2/2011 | Imaizumi et al. | |

(Continued)

FOREIGN PATENT DOCUMENTS

KR 10-2011-0023634 A 3/2011

*Primary Examiner* — Tapas Mazumder

(74) *Attorney, Agent, or Firm* — Cha & Reiter, LLC

(57) ABSTRACT

A method for image processing is provided comprising: detecting a rectangular image region (RIR) in one of a plurality of images while the plurality of images is being received; obtaining a coordinate corresponding to the detected RIR; and storing in a memory the coordinate and a link associating the coordinate with the image in which the RIR is detected.

20 Claims, 17 Drawing Sheets

(56) References Cited

U.S. PATENT DOCUMENTS

| | | |
|---|---|---|
| 2013/0070122 A1 | 3/2013 | Nijemcevic et al. |
| 2013/0314401 A1* | 11/2013 | Engle .................... G06T 19/006 345/419 |
| 2013/0332831 A1 | 12/2013 | Birnkrant et al. |
| 2013/0339848 A1* | 12/2013 | Patil .................. G06F 17/30156 715/255 |

* cited by examiner

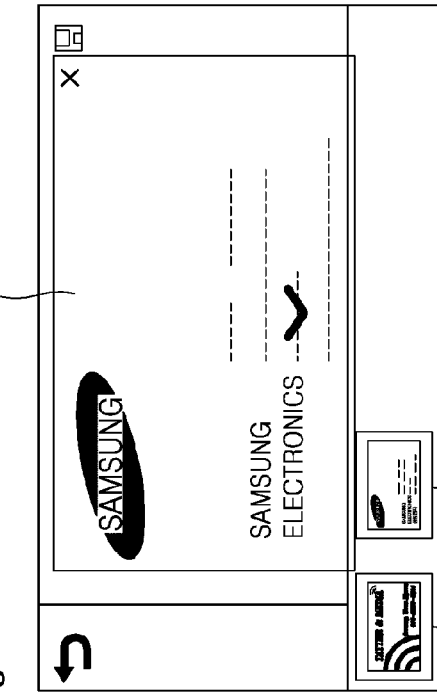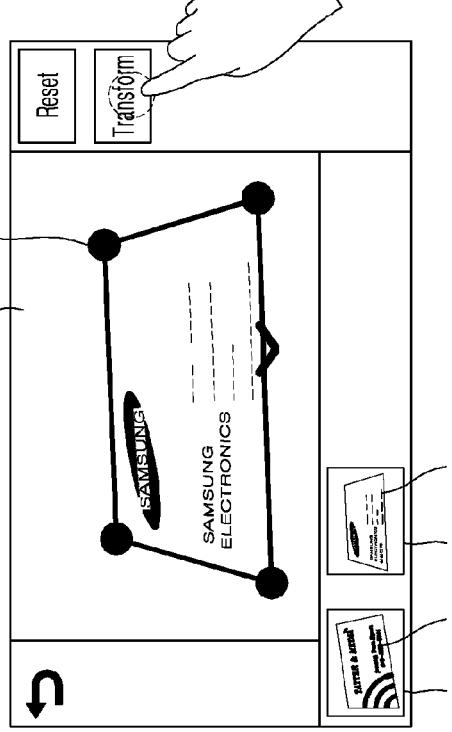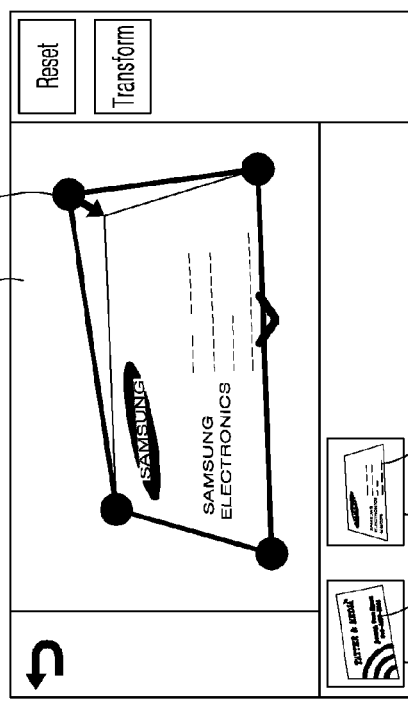
FIG. 10

METHOD AND APPARATUS FOR IMAGE PROCESSING

CLAIM OF PRIORITY

This application claims the benefit of Korean Patent Application No. 10-2014-0161159, filed on Nov. 18, 2014, in the Korean Intellectual Property Office, the disclosure of which is incorporated herein in its entirety by reference.

BACKGROUND

1. Field of the Disclosure

The present disclosure is related to image processing, and more particularly to a method and apparatus for image processing.

2. Description of the Related Art

Previously, in order to take images of multiple pages of various data, such as printouts and lecture materials, inconvenient steps should be performed in which an image of each item should be photographed one by one and then, for each photographed image, a rectangular region should be detected and image processing should be performed for perspective transformation.

In addition, though there are applications capable of photographing multiple images, in order to perform image processing of the plurality of images, an image of each item should be corrected and edited one by one as in the photographing of each single image.

That is, in the conventional electronic apparatuses providing a multiple photographing function, in order to perform image processing of a plurality of photographs taken, image processing of each of the plurality of taken images is performed simultaneously after finishing photographing of the plurality of images. Accordingly, there are overload in the image processing apparatus, time delays and a laborious task of managing a plurality of images.

SUMMARY

According aspects of the disclosure, a method for image processing comprising: detecting a rectangular image region (RIR) in one of a plurality of images while the plurality of images is being received; obtaining a coordinate corresponding to the detected RIR; and storing in a memory the coordinate and a link associating the coordinate with the image in which the RIR is detected.

According to aspects of the disclosure, an electronic device is provided comprising a display unit, a memory, and one or more processors configured to: detect a rectangular image region (RIR) in one of a plurality of images while the plurality of images is being received; obtain a coordinate corresponding to the detected RIR; and store, in the memory, the coordinate and a link associating the coordinate with the image in which the RIR is detected.

According to aspects of the disclosure, a non-transitory computer-readable medium storing processor-executable instructions, which when executed by the processor cause the processor to perform a method comprising the steps of: detecting a rectangular image region (RIR) in one of a plurality of images while the plurality of images is being received; obtaining a coordinate corresponding to the detected RIR; and storing, in a memory, the coordinate and a link associating the coordinate with the image in which the RIR is detected.

BRIEF DESCRIPTION OF THE DRAWINGS

These and/or other aspects will become apparent and more readily appreciated from the following description of the exemplary embodiments, taken in conjunction with the accompanying drawings in which:

FIG. 10 is a schematic diagram showing an example of a user interface for perspective transformation, according to aspects of the disclosure;

DETAILED DESCRIPTION

Figure 1:
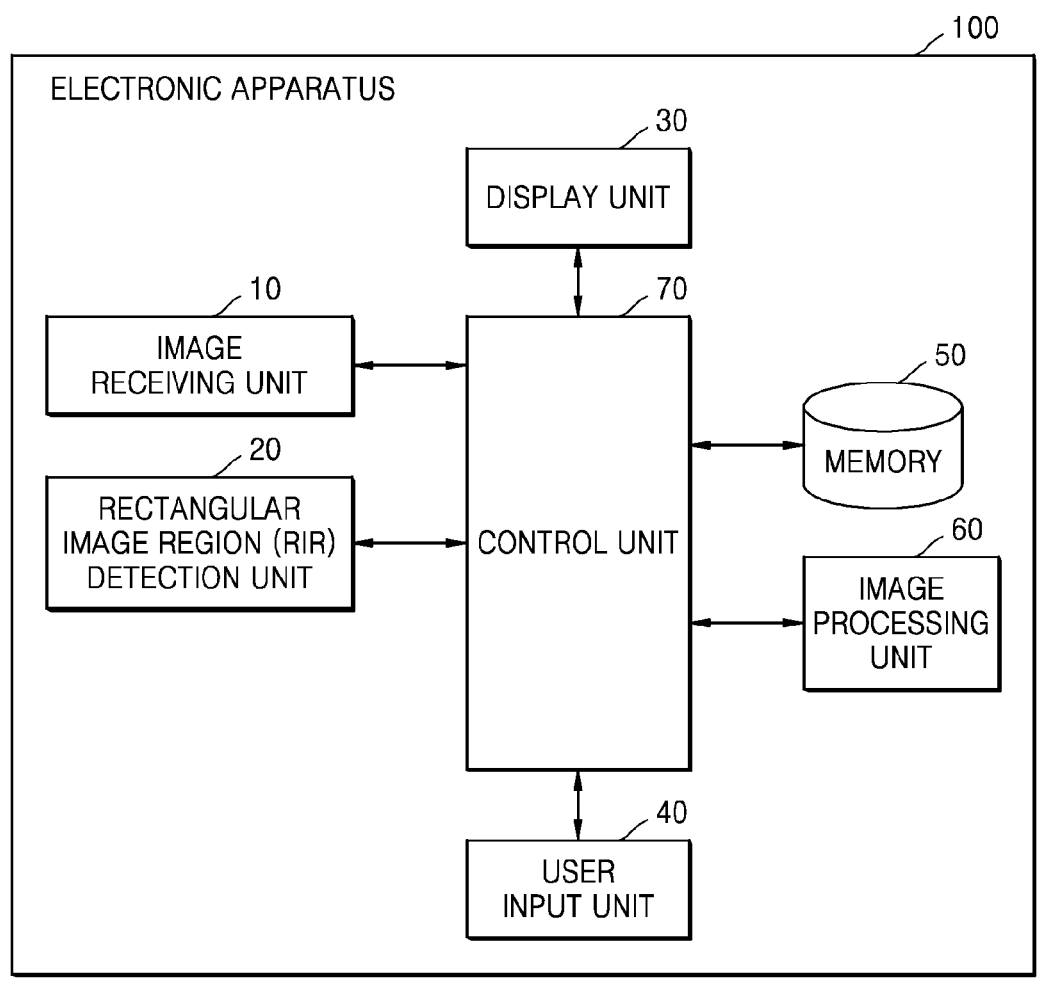
FIG. 1 is a block diagram of an example an electronic apparatus, according to aspects of the disclosure.

As the disclosure allows for various changes and numerous embodiments, particular embodiments will be illustrated in the drawings and described in detail in the written description. The effects and features of the present disclosure will be clearly understood by referring to embodiments described in detail together with drawings. This disclosure is not to be limited to the exemplary embodiments set forth herein.

While such terms as "first," "second," etc., may be used to describe various components, such components must not be limited to the above terms. The above terms are used only to distinguish one component from another.

An expression used in the singular encompasses the expression of the plural unless it has a clearly different meaning in the context. In the present specification, it is to be understood that the terms such as "including" or "having," etc., are intended to indicate the existence of the features, or components and are not intended to preclude the possibility that one or more other features, or components thereof may exist or may be added.

Hereinafter, aspects of the present disclosure will be described in more detail with reference to the accompanying drawings. Those components that are the same or are in correspondence are rendered the same reference numeral regardless of the figure number, and redundant explanations are omitted.

Expressions such as "at least one of," when preceding a list of elements, modify the entire list of elements and do not modify the individual elements of the list.

FIG. 1 is a block diagram of an example of an electronic apparatus 100 which recognizes a rectangular image region (RIR) of each of a plurality of images during continuous photographing of the plurality of images according to aspects of the disclosure.

The electronic apparatus 100 may include an image receiving unit 10, a rectangular image region (RIR) detection unit 20, a display unit 30, a user input unit 40, a memory 50, an image processing unit 60 and a control unit 70.

Hereinafter the components will be explained one by one.

The control unit 70 according to the exemplary embodiment generally controls the overall operations of the electronic apparatus 100.

That is, the control 70 may control operations of the image receiving unit 10, the RIR detection unit 20, the display unit 30, the user input unit 40, the memory 50 and the image processing unit 60 shown in FIG. 1.

Some or all of the image receiving unit 10, the RIR detection unit 20, the display unit 30, the user input unit 40, the memory 50 and the image processing unit 60 may operate by a software module. However, the embodiment is not limited to this and some of the components described above may be operated as hardware.

Also, at least one of the of the image receiving unit 10, the RIR detection unit 20 and the image processing unit 60 may be included in the control unit 70, but the embodiment is not limited by this implementation.

The user input unit 40 which includes a key to generate an electrical signal from a user is provided in the electronic apparatus 100. The electrical signal from this user input unit 30 is transmitted to the control unit 70 such that the control unit 70 controls the electronic apparatus 100, according to the electrical signal.

An image photographing unit (not shown) according to an exemplary embodiment may take a plurality of images sequentially.

The image photographing unit (not shown) is for inputting an image signal to the electronic apparatus 100 and may include a camera.

The camera may include a lens unit (not shown) and an image sensor (not shown).

For example, an optical signal passing through the lens unit (not shown) may form an image of an object when arriving at a light receiving face of the image sensor (not shown).

The camera may obtain an image frame including at least one of still images and moving images obtained by the image sensor in a video communication mode or a photographing mode.

The image receiving unit 10 according to the embodiment may receive an input image.

The input image according to the embodiment may be an input image obtained from a camera. For example, the input image obtained from the camera may be a preview image or may be an image saved in the memory 50. Also, the input image may be manually input by a manipulation of a user or may be input from a web server through a network.

The RIR detection unit 20 according to the embodiment may detect an RIR in an input image received in the image receiving unit 10.

In this case, as there are a variety of methods commonly used in the industry as a method of detecting a rectangular region from an input image, it should be noted that the method of detecting an RIR in an input image is not limited to a particular method.

For example, a rectangular image region (RIR) according to the embodiment is an object having a rectangular shape included in an input image and coordinate information corresponding to the RIR may be used to generate a thumbnail image including a predetermined identification mark together with an input image in the future.

In this case, the predetermined identification mark included in the thumbnail image is a mark to identify an RIR in a thumbnail image and may be generated based on the coordinate information.

Also, the coordinate information may be used to perform image processing of an input image for perspective transformation. For example, the coordinate information may be used to generate a matrix of image processing for perspective transformation.

The memory 50 may include any suitable type of storage device, including a flash memory type, a hard disk type, a multimedia card micro type, a card-type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk and an optical disk, a network-accessible storage (NAS), cloud-based storage, etc. The memory 50 according to the embodiment may store a program for processing and control of the control unit 70 or may store data which is input to and/or output from the electronic apparatus 100.

For example,

Also, the electronic apparatus 100 may operate a web storage or cloud server performing a network storage function.

Programs stored in the memory 50 may be classified into a plurality of modules according to functions, and, for example, may be classified into a UI module (not shown) and a touch screen module (not shown).

The UI module (not shown) may provide a specialized UI and GUI linked to an electronic apparatus.

The user interface according to an exemplary embodiment is for editing a thumbnail image.

For example, by using the user interface, the user may change the sort order of a plurality of thumbnail images displayed on the display unit 30 or may delete thumbnail images selected by the user.

Also, the user interface may be for editing an identification mark displayed together with a thumbnail image.

Also, the user interface may be for simultaneously performing image processing a plurality of thumbnail images displayed on the display unit 30 for perspective transformation.

Also, the user interface may be for resizing a plurality of thumbnail images displayed on the display unit 30 to a predetermined size.

As the function of the UI module (not shown) may be inferred intuitively from the name by a person skilled in the art, detailed explanation will be omitted here.

The touch screen module (not shown) may sense a touch gesture on a touch screen of the user and transmit the information on the touch gesture to the control unit 70. The touch screen module (not shown) may be formed as a separate controller (hardware, H/W).

For example, the touch gesture of the user may include a tap, a touch and hold, a double tap, a drag, a panning, a flick, a drag and drop and a swipe.

The memory 50 according to the embodiment may save a plurality of input images received by the electronic apparatus 100 and information on a plurality of coordinates corresponding to RIRs detected in the plurality of input images.

For example, the coordinate information may include coordinate information of pixels corresponding to each corner of an RIR detected in an input image. In this case, the coordinate information may be used when image processing is performed based on the input image.

Also, the memory 50 according to the embodiment may save a thumbnail image generated based on the coordinate information and the input image or a transformed image obtained by performing image processing for perspective transformation.

According to this, when image processing of a plurality of input images is performed in the future, the electronic apparatus 100 may use the information of the plurality of coordinates saved in the memory 50 and thus prevent overload in the electronic apparatus 100.

Also, a category related to a plurality of input images received sequentially may be generated. In this case, the transformed images related to the plurality of input images may be saved in the memory 50 in relation to the category.

According to this, the electronic apparatus 100 may allow the user to easily manage the plurality of images.

The display unit 30 according to the embodiment may include at least one of a liquid crystal display, a thin film transistor-liquid crystal display, an organic light-emitting diode, a flexible display and a 3D display.

When the display unit 30 is formed as a touch screen in a mutual layer structure with a touchpad, the display unit 30 may be used as an input device as well as an output device. The touch screen may be implemented to detect a touch input pressure as well as a touch input location and a touched area. Also, the touch screen may be implemented to detect a proximity touch as well as a real touch.

The display unit 30 according to the embodiment may display image data which are input to and/or output from the electronic apparatus 100.

The display unit 30 according to the embodiment may display a plurality of transformed images related to a plurality of input images sequentially received.

For example, the display unit 30 may display input images sequentially received in the image receiving unit 10.

Also, thumbnail images including predetermined identification marks may be displayed. In this case, a predetermined identification mark may be a mark to identify an RIR in a thumbnail image.

Also, an image obtained by enlarging a thumbnail image selected by the user may be displayed with a plurality of thumbnail images. According to this, the user may see a bigger thumbnail image including a predetermined identification mark to identify an RIR, and therefore visibility of the plurality of thumbnail images is enhanced.

Also, the user may edit the thumbnail image by using the enlarged thumbnail image.

Also, the display unit 30 according to the embodiment may display a transformed image in which a predetermined image processing procedure is completed based on an input image saved in the memory 50.

For example, the transformed image may be an image which is generated based on an input image and coordinate information and for which image processing for perspective transformation is performed.

Also, the transformed image may be an image which is obtained by completing post-processing of a perspective transformed image. Also, the transformed image may be an image obtained by resizing a perspective transformed image.

The user input unit 40 according to the embodiment generates input data for the user to control operations of the electronic apparatus 100.

The user input unit 40 may be implemented with a keypad, a dome switch, a touchpad (a contact-type capacitance method, a pressure-type resistive overlay method, an infrared sensing method, a surface ultrasound transmission method, an integral tension measuring method, a piezo effect method and the like), a jog wheel and a jog switch. In particular, when the touchpad and the display unit 30 to be explained later form a mutual layer structure, this may be referred to as a touch screen.

The user input unit 40 according to the embodiment may generate a signal for the user to select a thumbnail image which the user wants to edit among a plurality of thumbnail images displayed on the display unit 30.

Also, the user input unit 40 may generate a signal to edit a thumbnail image selected by the user.

For example, the user input unit 40 may generate at least one of a signal for editing an identification mark included in a thumbnail image, a signal for performing image processing of a plurality of thumbnail images for perspective transformation, a signal for resizing a plurality of thumbnail images into a predetermined size, a signal for post-processing a plurality of thumbnail images and a signal for displaying a plurality of transformed images saved in a category.

The image processing unit 60 according to the embodiment may reduce noise in input image data received in the image receiving unit 10, and perform image signal processing for picture quality improvement such as Gamma correction, color filter array interpolation, color matrix, color correction and color enhancement.

Also, the image processing unit 60 may generate image files by compressing image data obtained by image signal processing for picture quality improvement, or may restore image data from the image files. For example, the compression type of an image may be reversible or irreversible. As an example of an appropriate compression type, the transformation may be a Joint Photographic Experts Group (JPEG) type or JPEG 2000 type. In this case, the compressed data may be saved in the memory 50.

Also, the image processing unit 60 may functionally perform indistinctness processing, color processing, blur processing, edge emphasis processing, image interpretation processing, image recognition processing, and image effect processing.

For example, image recognition processing may include face recognition or scene recognition processing. The image processing unit 60 according to the embodiment may perform scene recognition processing of input images sequentially received in the image receiving unit 10. For example, when a plurality of input images corresponding to adjacent frames are recognized as an identical scene in the image processing unit 60, different processings for the plurality of input images sequentially received in the image receiving unit 10 may be performed in the RIR detection unit 20. This will be explained in detail later with reference to FIG. 3.

Also, the image processing unit 60 may perform adjustment of brightness level, color correction, contrast adjustment, outline emphasis adjustment, screen division processing, character image generation and synthesizing processing of images. This will be explained in detail later with reference to FIG. 13.

The image processing unit 60 may be connected to an external monitor and perform a predetermined image signal processing for display on the external monitor. By transmitting thus processed image data, the image may be displayed on the external monitor.

Also, the image processing unit 60 may execute a program stored in the memory 50 or may have a separate module.

Also, image data output from the image processing unit 60 may be transmitted to the control unit 70 directly or through the memory 50.

The image processing unit 60 according to the embodiment may perform a predetermined image processing for a plurality of input images sequentially received in the image receiving unit 10.

For example, by using a plurality of input images and coordinate information stored in the memory 50, the image processing unit 60 may generate a plurality of thumbnail images. Also, by performing image processing for a plurality of input images or a plurality of thumbnail images for perspective transformation, the image processing unit 60 may generate a plurality of transformed images.

Also, the image processing unit 60 may perform image processing of a plurality of thumbnail images for perspective transformation, resize the plurality of perspective transformed thumbnail images into a predetermined size and thus generate a plurality of transformed images.

Also, the image processing unit 60 may generate a plurality of transformed images by performing image processing of a plurality of thumbnail images for perspective transformation and post-processing. In this case, the post-processing of images may include an image processing including at least one of adjustment of brightness level, color correction, contrast adjustment and outline emphasis adjustment.

In this case, the image processing unit 60 may perform image processing of a plurality of thumbnail images simultaneously with image processing of a plurality of input images.

The control unit 70, according to aspects of the disclosure, may include one or more processors. Each of the processors may include any suitable type of processing circuitry, such as one or more of a general-purpose processor (e.g., an ARM-based processor), an Application-Specific Integrated Circuit (ASIC), a Field-Programmable Gate Array (FPGA), a Digital Signal Processor (DSP), a Programmable Logic Device (PLD), etc. In operation, the control unit 70 according to the embodiment may control operations among the image receiving unit 10, the RIR detection unit 20, the display unit 30, the user input unit 40, the memory 50 and the image processing unit 60.

For example, whenever the image receiving unit 10 sequentially receives a plurality of input images, the control unit 70 may control the RIR detection unit 20 to detect in parallel an RIR in a received input image.

In this case, the control unit 70 may control coordinate information corresponding to an RIR to be saved in the memory 50 with reference to the input image.

Also, the control unit 70 may control the image processing unit 60 to perform scene recognition processing to determine whether or not a plurality of input images corresponding to adjacent frames sequentially received in the image receiving unit 10 are of an identical scene. In this case, the control unit 70 may control the RIR detection unit to operate differently according to the determination result of the image processing unit 60. This will be explained in detail later with reference to FIG. 3.

Also, the control unit 70 may control the image processing unit 60 to generate a plurality of thumbnail images including predetermined identification marks by using a plurality of input images and coordinate information saved in the memory 50.

In this case, the predetermined identification mark is a mark to identify an RIR in a thumbnail image and the user may confirm an RIR, which is detected in an input image, in the form of a thumbnail image.

Also, the control unit 70 may control a user interface for editing a plurality of thumbnail images to be displayed on the display unit 30.

For example, the user interface may be for editing an identification mark displayed together with a thumbnail image.

In this case, the user may edit the identification mark included in a thumbnail image by editing the identification mark included in an enlarged image obtained by enlarging the thumbnail image.

Also, the user interface may be for simultaneously performing image processing of a plurality of thumbnail images displayed on the display unit 30 for perspective transformation.

In this case, the user may simultaneously perform image processing of a plurality of thumbnail images for perspective transformation, by using the user interface included in an image obtained by enlarging the thumbnail image.

Also, the user interface may be for resizing a plurality of thumbnail images displayed on the display unit 40 to a predetermined size.

In this case, the transformed image obtained by performing perspective transformation of a plurality of input images or a plurality of thumbnail images may be resized to a predetermined size and displayed in an identical size on the display unit 30. Also, a plurality of transformed images may be saved in an identical size in the memory 50.

According to this, a plurality of transformed images related to a plurality of input images may be displayed in an identical size through the display unit 30 of the electronic apparatus 100 or a display unit of an external device, thus enhancing visibility and readability for the user.

Also, the user interface may be for the image processing unit 60 to perform predetermined post-processing of a plurality of thumbnail images displayed on the display unit 30.

In this case, the plurality of transformed images related to a plurality of input images may be displayed on the display unit 30 or saved in the memory 50 after identical post-processing is performed for the plurality of transformed images based on a user input.

Also, the control unit 70 may control the image processing unit 60 to determine whether or not an identification mark included in a thumbnail image is a valid rectangular region and may control the display unit 30 to output a different user interface according to the determination result. This will be explained in detail later with reference to FIG. 11.

Also, the control unit 70 may control a category related to receiving a plurality of input images to be generated, and a plurality of transformed images related to the plurality of input images to be saved in the memory 50 with reference to the category. In this case, the control unit 70 may control information related to the plurality of transformed images to be displayed on the display unit 30 together with the category. For example, information related to a plurality of transformed images may include at least one of the number of the plurality of transformed images and thumbnail images corresponding to the plurality of transformed images.

This will be explained in detail later with reference to FIGS. 14 through 16.

A variety of embodiments explained here may be implemented as software, hardware or a computer readable recording medium using a combination of software and hardware.

According to software implementation, embodiments such as procedures or functions may be implemented with a separate software module for performing at least one function or operation. A software code may be implemented by a software application written in an appropriate program language. Also, a software code may be stored in the memory 50 and executed by the control unit 70.

Operations of the electronic apparatus 100 will now be explained in detail in order.

Figure 2:
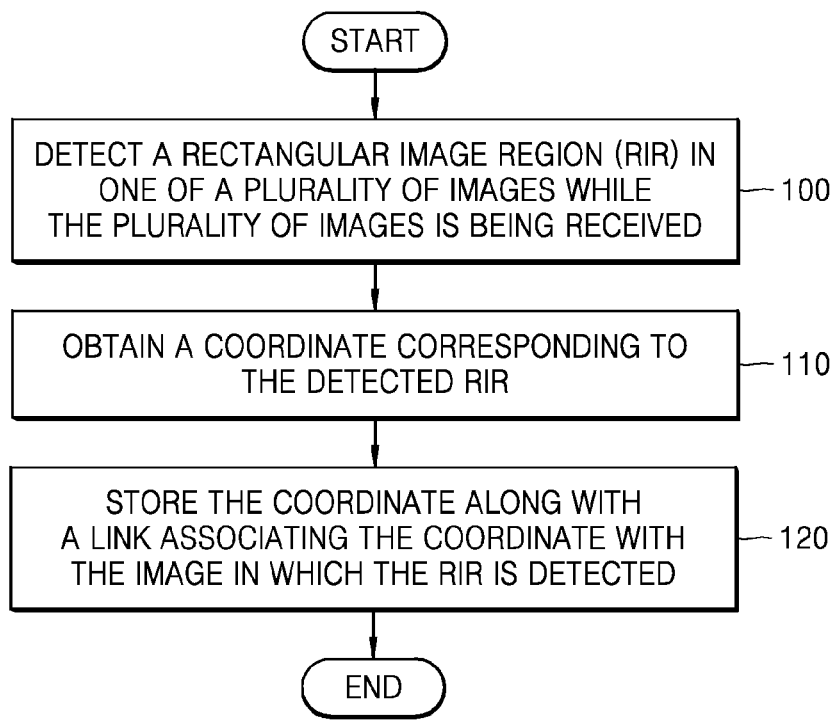
FIG. 2 is a flowchart of an example of a process for image processing, according to aspects of the disclosure.

FIG. 2 is a flowchart of an example of a process for image processing, according to aspects of the disclosure.

In operation 100, while the electronic apparatus 100 sequentially receives a plurality of input images, an RIR is detected in one of the images from the plurality. As there is a variety of methods commonly used in the industry to detect RIRs in an image, it should be noted that the present disclosure is not limited to any specific method.

In operation 110, the electronic apparatus 100 obtains coordinate information corresponding to the RIR detected in operation 100. For example, the coordinate information may include the coordinates of pixels located in each corner of the detected RIR.

In operation 120, the electronic device 100 saves the coordinate information obtained in operation 110 after linking the coordinate information to the input image.

In this case, the electronic apparatus 100 may perform predetermined image processing of an input image, by using coordinate information saved in the memory 50. For example, a thumbnail image including a predetermined identification mark may be generated. Additionally or alternatively, a transformed image obtained by performing image processing of an input image or a thumbnail image for perspective transformation may be generated.

Figure 3:
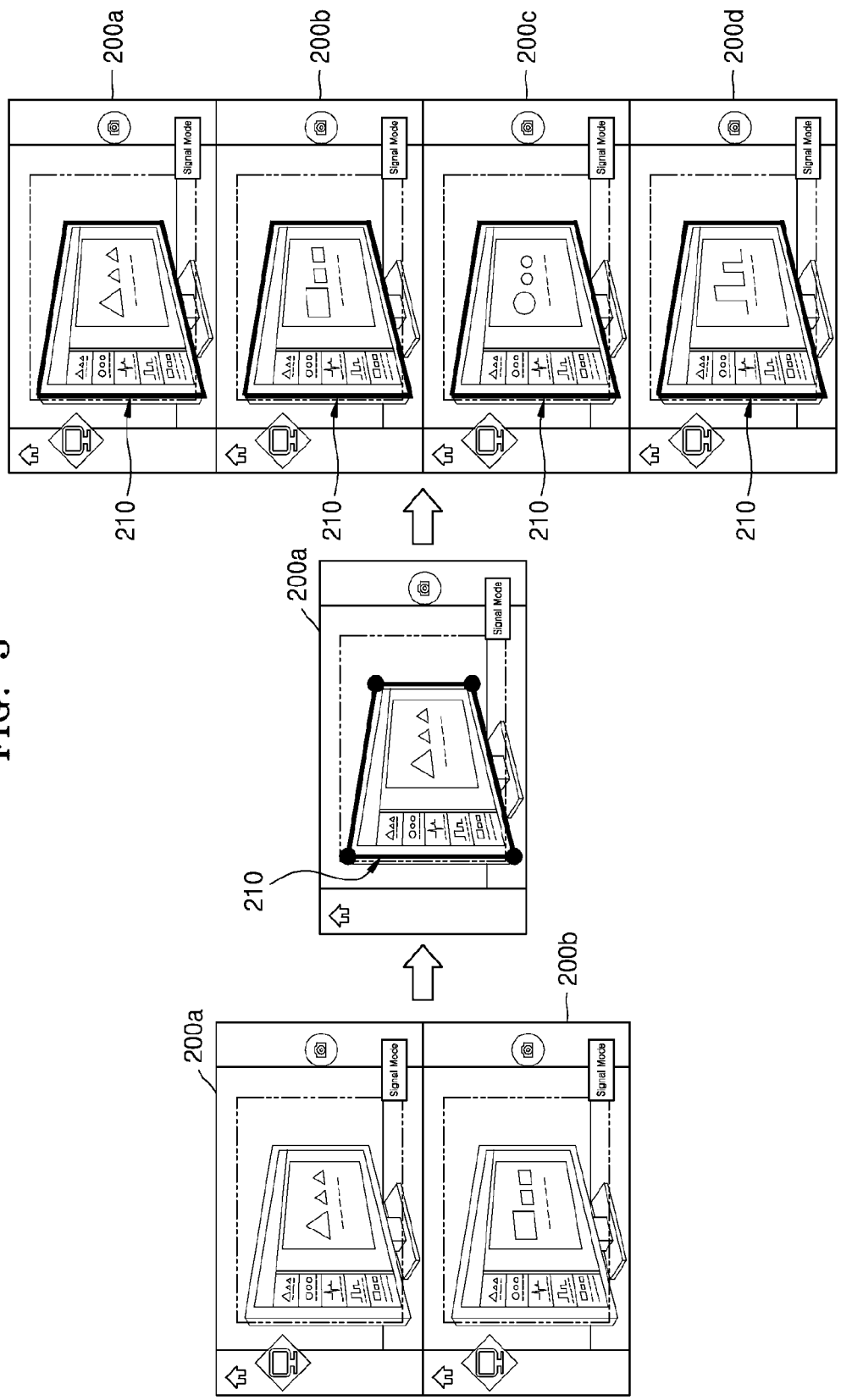
FIG. 3 is a schematic diagram showing an example in which an electronic apparatus detects RIRs in a plurality of input images when a predetermined condition is satisfied, according to aspects of the disclosure.

FIG. 3 is a schematic diagram showing an example in which an electronic apparatus 100 detects RIRs in a plurality of input images when a predetermined condition is satisfied, according to aspects of the disclosure.

As shown in FIG. 3, when a first image 200A and a second image 200B are sequentially received, it may be determined in the image processing unit 60 of the electronic apparatus 100 whether or not the first image 200A and the second image 200B belong to an identical scene. For example, scene recognition processing between the first image 200A and the second image 200B may be performed in the image processing unit 60.

Any suitable technique for determining whether the images belong to the same scene can be used. For example, if the view angle of the first image 200A is the same as the view angle of the second image 200B, it may be determined that the first image 200A and the second image 200B belong to an identical scene.

In this case, the view angle of each image may be determined based on input data analyzed in the image processing unit 60.

Additionally or alternatively, if the electronic apparatus 100 is a digital camera, when an object is in focus, the view angle may vary according to a focal length which is a distance between a lens unit (not shown) to an image sensor (not shown). For example, if the focal length is long, the view angle becomes narrow and the object to be photographed becomes bigger. Meanwhile, a lens with a shorter focal length has a wider view angle and the scope to be photographed becomes wider. Accordingly, if the electronic apparatus 100 is a digital camera, it may be determined based on the focal length whether or not the first image 200A and the second image 200B have an identical view angle.

Additionally or alternatively, a motion of the electronic apparatus 100 may be detected and if the electronic apparatus 100 does not move for a predetermined time period, it may be determined that the first image 200A and the second image 200B are of an identical scene. In this case, the motion of the electronic apparatus 100 may be sensed via a sensor mounted in the electronic apparatus 100. For example, if there is no motion sensed by the sensor for a predetermined time period, it may be determined that the electronic apparatus 100 is in a stationary state.

When the view angles of the first image 200A and the second image 300B are identical (or otherwise match), as illustrated in FIG. 3, it may be determined that the first image 200A and the second image 200B are of an identical scene. When it is determined that the first image 200A and the second image 200B are of an identical scene, the electronic apparatus 100 may continue to receive a third image 200C and a fourth image 200D without recognizing an RIR included in the second image 200B after the second image 200B is received.

When the images 200A-D are part of the same scene, by using the coordinate information obtained in the first image 200A, the electronic apparatus 100 may perform image processing of the second image 200B, the third image 200C and the fourth image 200D. In this case, the coordinate information obtained in the first image 200A is information on the coordinates corresponding to an RIR 210 detected in the first image 200A before the second image 200B is received, and may be saved in advance in the memory 50 before the receiving of a plurality of input images is completed. Accordingly, when a plurality of input images belonging to the same scene are received, it is not needed to detect an RIR in each of the plurality of input images, thereby achieving a more efficient utilization of the resources of the electronic apparatus 100.

Figure 4:
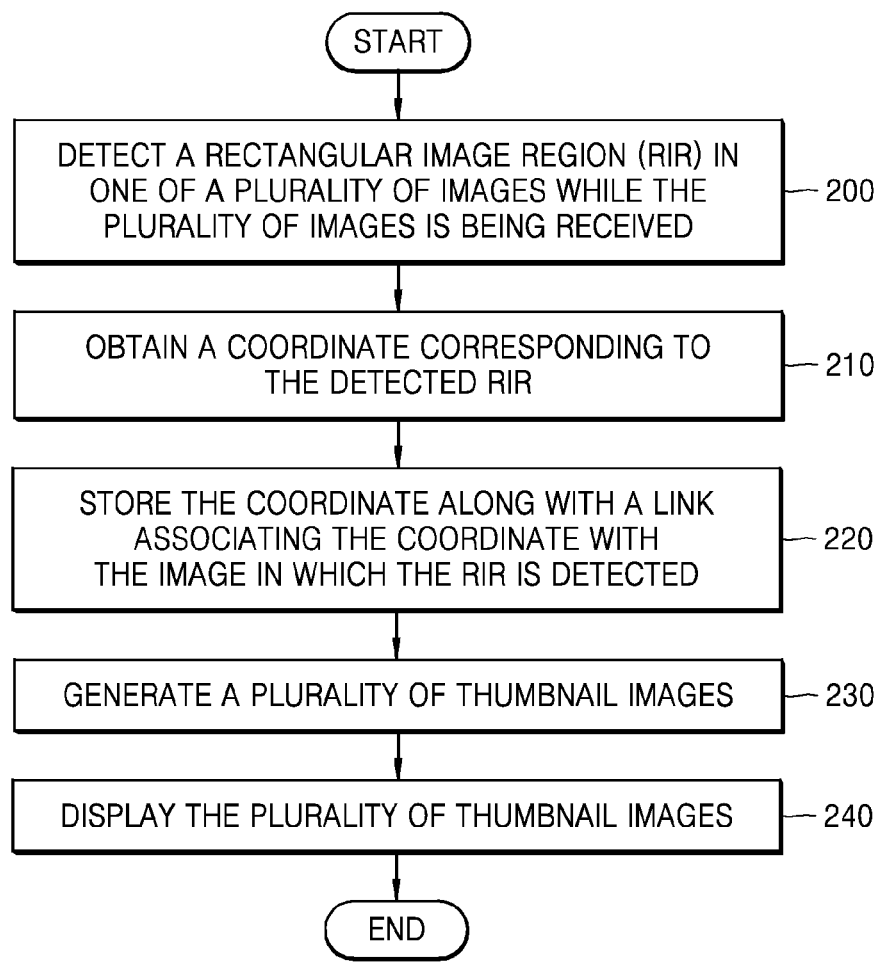
FIG. 4 is a flowchart of an example of a process for image processing, according to aspects of the disclosure.

FIG. 4 is a flowchart of an example of a process for image processing, according to aspects of the disclosure. Operations 200 through 220 are similar to operations 100 through 120 of FIG. 2, and therefore detailed explanation will be omitted.

In operation 230, the electronic apparatus 100 generates a plurality of thumbnail images including predetermined identification marks, based on coordinate information and a plurality of input images saved in operation 220.

For example, the predetermined identification mark may be a mark to identify an RIR in a thumbnail image and may be generated based on the coordinate information.

In operation 240, the electronic apparatus 100 displays the plurality of thumbnail images generated in operation 230 on the display unit 30 for user viewing and selection.

An image obtained by enlarging a thumbnail image selected by the user may be displayed together with the plurality of thumbnail images. In some aspects, presenting the user with a bigger thumbnail image may help the user see the image's identification mark more clearly. In some aspects, a user interface for editing the enlarged thumbnail image may also be displayed.

Figure 5:
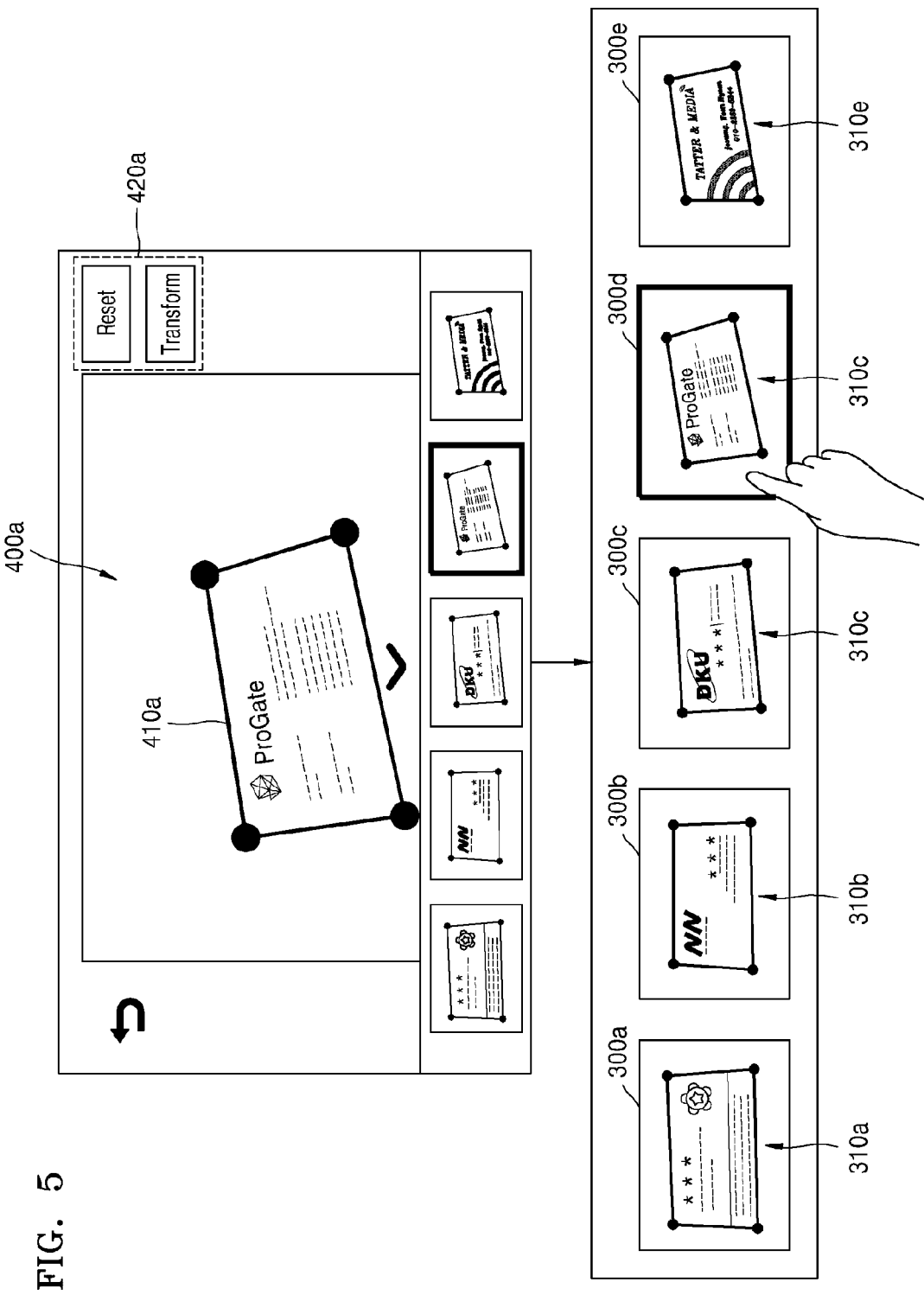
FIG. 5 is a schematic diagram showing an example of a user interface for image selection, according to aspects of the disclosure.

FIG. 5 is a schematic diagram showing an example of a user interface for image selection, according to aspects of the disclosure. As shown in FIG. 5, the electronic apparatus 100 may display a plurality of thumbnail images for the user to select on the display unit 30. In addition, predetermined identification marks 310A through 310E which are generated based on coordinate information saved in the memory 50 may be displayed together in the plurality of thumbnail images 300A through 300E.

Accordingly, the electronic apparatus 100 displays identification marks 310A through 310E for identifying an RIR in a thumbnail image together when displaying the plurality of thumbnail images 300A through 300E, thus enabling the user to identify the plurality of images in which RIRs are recognized. When a thumbnail image 300D is selected based on input from the user as shown in FIG. 5, an image obtained by enlarging the selected thumbnail image 300D (hereinafter will be referred to as an edit image 400A) may be displayed on the display unit 30.

As shown in FIG. 5, the identification mark 410A corresponding to the RIR included in the edit image 400A may be displayed in the edit image 400A. In this case, the identification mark 410A may correspond to a mark obtained by enlarging the identification mark 310D included in the thumbnail image 300 selected by the user.

For example, in the edit image 400A and the user interface 420A for editing the thumbnail image 300D selected by the user may be displayed together. In this case, the user interface 420A may be for correcting the identification mark 310D included in the thumbnail image 300D selected by the user. Additionally or alternatively, the user interface 420D may be for simultaneously performing perspective transformation of the plurality of thumbnail images 300A through 300E displayed on the display unit 30.

In this case, the image processing unit 60 in the electronic apparatus 100 according to the embodiment may also edit a plurality of input images saved in the memory 50 at the same time based on the user's interactions with the edit image 400 via the interface 420A.

Figure 6:
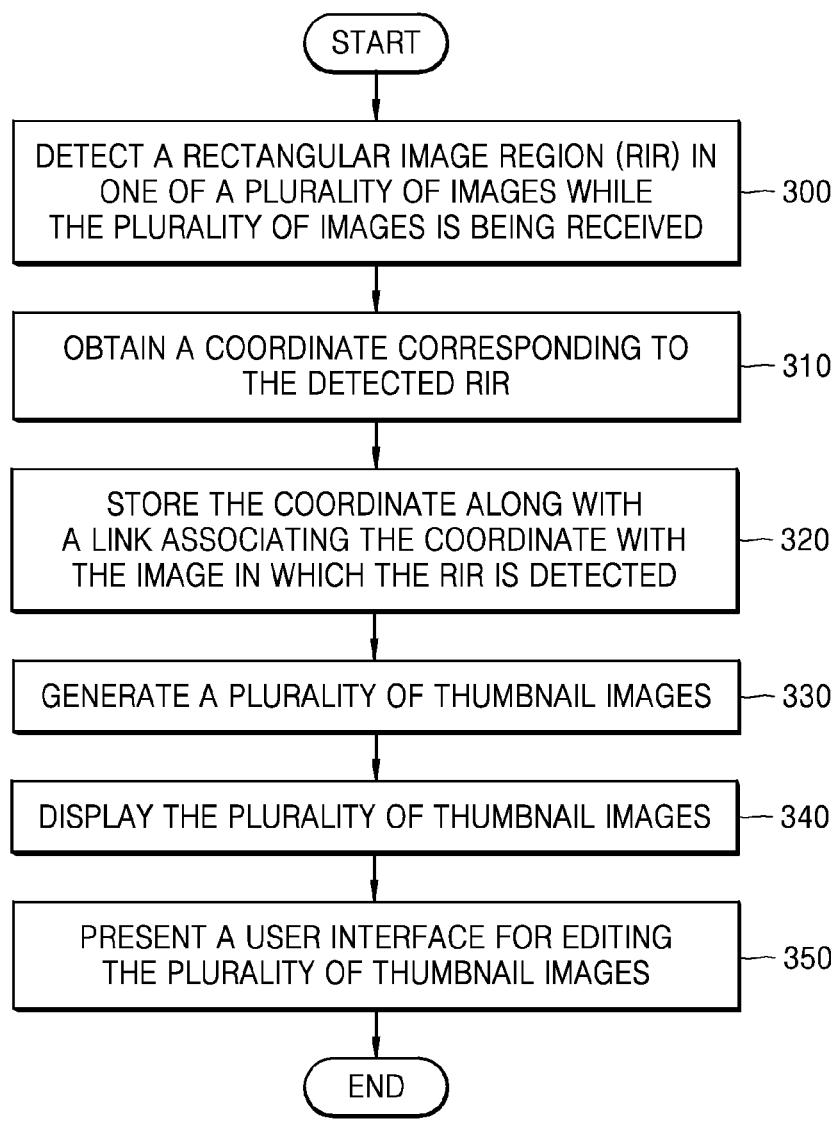
FIG. 6 is a flowchart of a process for image processing, according to aspects of the disclosure.

FIG. 6 is a flowchart of a process for image processing, according to aspects of the disclosure.

Operations 300 through 340 correspond to the operations 200 through 240 of FIG. 4 and therefore detailed explanation will be omitted.

In operation 350, the electronic apparatus 100 provides a user interface for editing a plurality of thumbnail images displayed on the display unit 30 in operation 340.

For example, the user interface may be for editing an identification mark displayed together with a thumbnail image.

In this case, the user may edit the identification mark included in a thumbnail image by editing the identification mark included in an enlarged image obtained by enlarging the thumbnail image.

Also, the user interface may be for simultaneously applying a perspective transformation to a plurality of thumbnail images displayed on the display unit 30.

In some implementations, the user may simultaneously perform image processing of a plurality of thumbnail images for perspective transformation, by using the user interface included in an image obtained by enlarging the thumbnail image.

Additionally or alternatively, the user interface may be for resizing a plurality of thumbnail images displayed on the display unit 40 to a predetermined size. In this case, each transformed image obtained by applying a perspective transformation to a different one of the plurality of input images or a plurality of thumbnail images may be resized to a predetermined size. Also, the transformed images may be saved in an identical size in the memory 50.

Additionally or alternatively, the user interface may be for the image processing unit 60 to perform predetermined post-processing of a plurality of thumbnail images displayed on the display unit 30. In this case, the plurality of transformed images related to a plurality of input images may be displayed on the display unit 30 or saved in the memory 50 after identical post-processing is performed for the plurality of transformed images based on a user input.

Additionally or alternatively, the control unit 70 may control the image processing unit 60 to determine whether or not an identification mark included in a thumbnail image is a valid rectangular region and may control the display unit 30 to output a different user interface according to the determination result. Thus, in some instances, the user interface may be automatically selected for display based on the identification mark of a given image.

Figure 7:
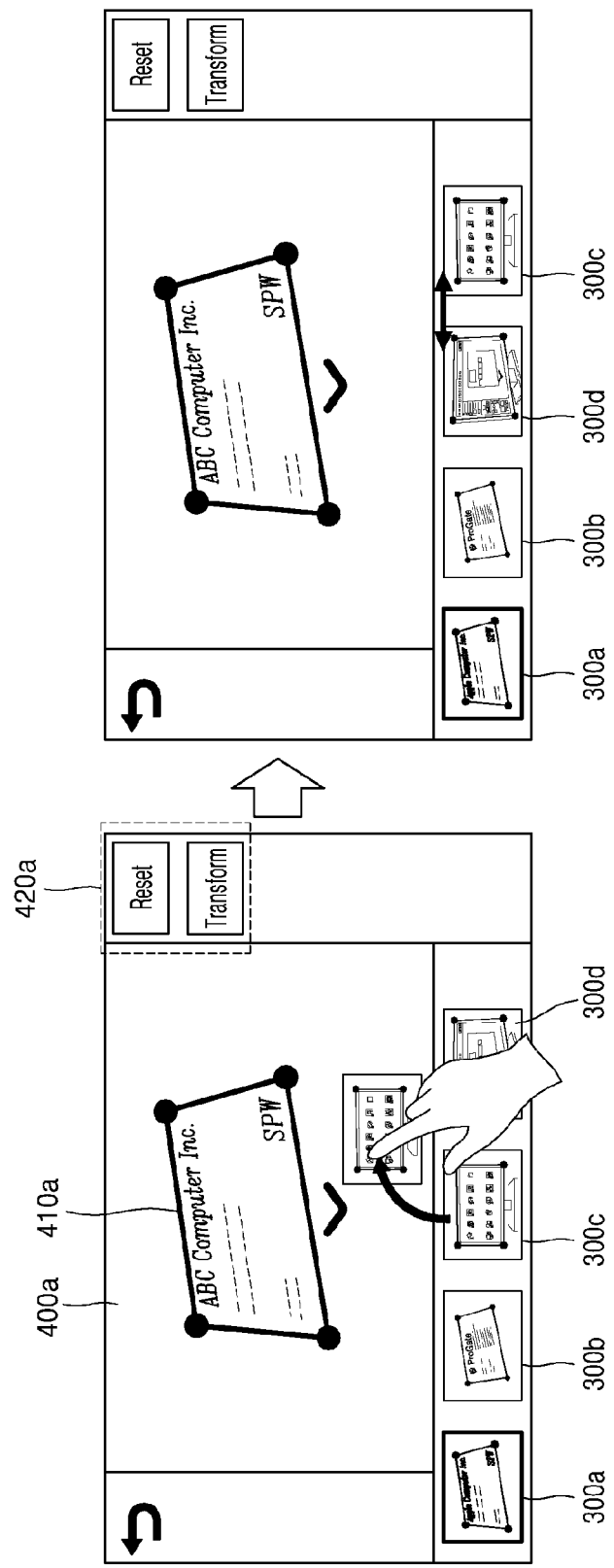
FIG. 7 is a schematic diagram showing an example of a user interface for sorting thumbnail images, according to aspects of the disclosure.

FIG. 7 is a schematic diagram showing an example of a user interface for sorting thumbnail images, according to aspects of the disclosure. As shown in FIG. 7, the sort order of a plurality of thumbnail images 300A through 300D displayed on the display unit 30 may be changed based on a user input. For example, as shown in FIG. 7, a thumbnail image 300C may be dragged and dropped to the rightmost position on the display based on a user input. In this case, the sort order of the plurality of thumbnail images displayed on the display unit 30 may be changed by the movement of the position of the selected thumbnail image 300C. In some implementations, the sort order of a plurality of input images saved in the memory 50 may be changed correspondingly to the changed sort order of the plurality of thumbnail images.

Figure 8:
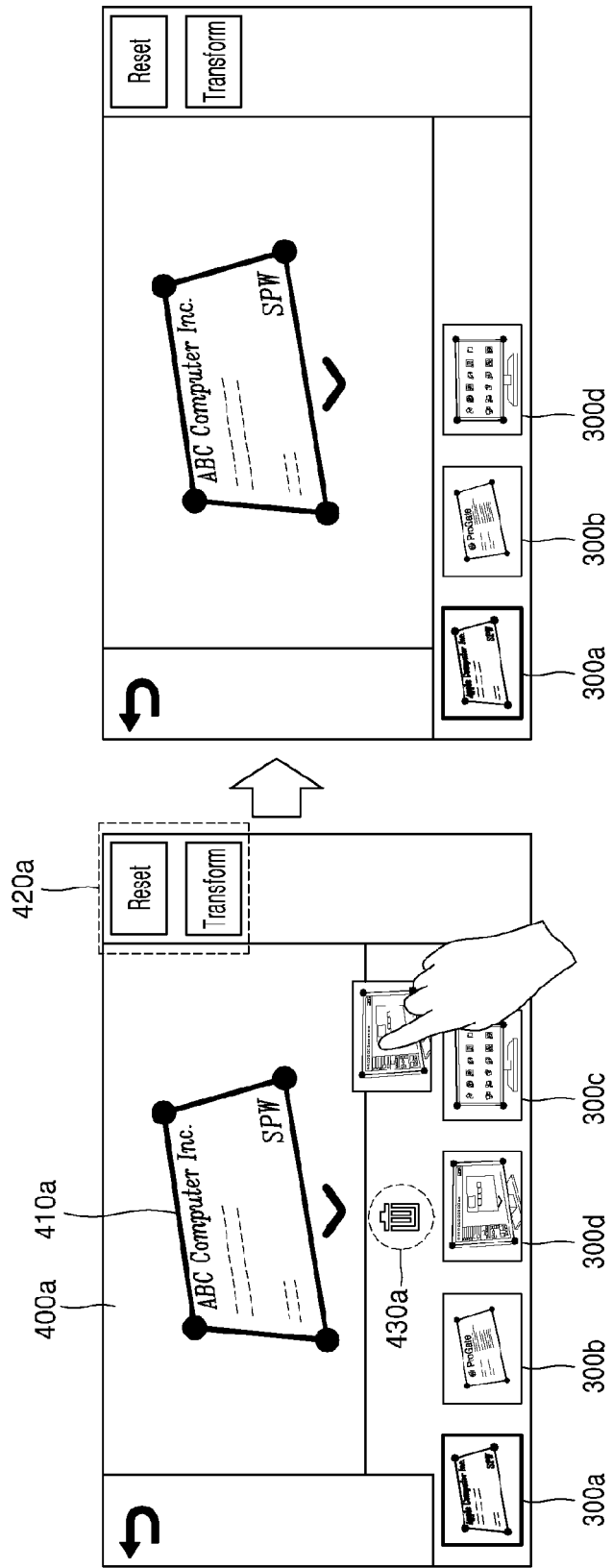
FIG. 8 is a schematic diagram showing an example of a user interface for deleting thumbnail images, according to aspects of the disclosure.

FIG. 8 is a schematic diagram showing an example of a user interface for deleting thumbnail images, according to aspects of the disclosure. As shown in FIG. 8, the plurality of thumbnail images 300A through 300D displayed on the display unit 30 may be deleted based on a user input. For example, the thumbnail image 300C may be dragged and dropped in the area of the user interface 430A displayed on the display unit 30 based on a user input as shown in FIG. 8. In this case, the thumbnail image 300C may be deleted in the display unit 30 by the user interface 430A. In some implementations, an input image saved in the memory 50 may be deleted correspondingly to the delete of the thumbnail image 300C.

Figure 9:
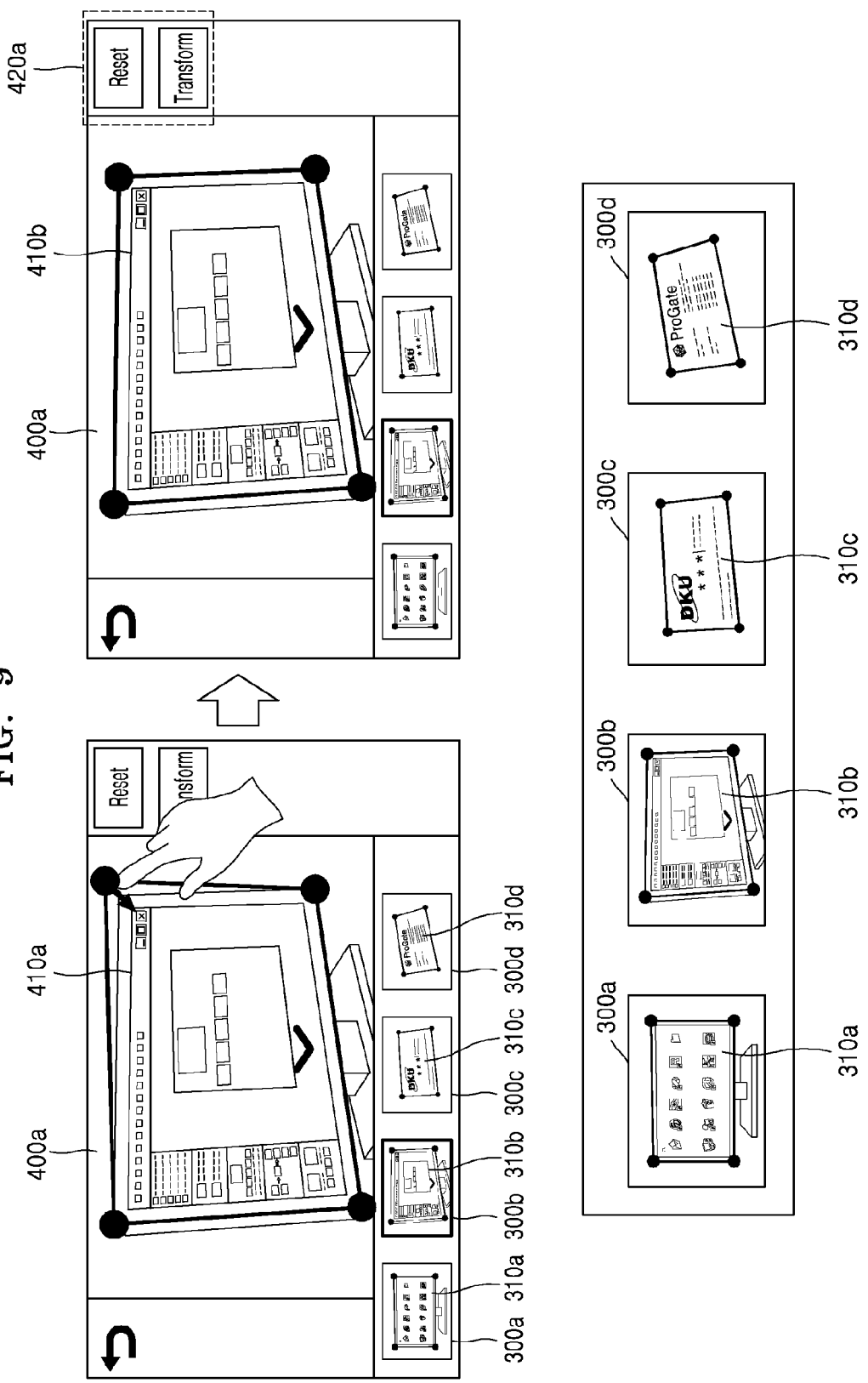
FIG. 9 is a schematic diagram showing an example of a user interface for editing an identification mark displayed together with the identification mark's respective thumbnail image, according to aspects of the disclosure.

FIG. 9 is a schematic diagram showing an example of a user interface for editing an identification mark displayed together with the identification mark's respective thumbnail image, according to aspects of the disclosure. As shown in FIG. 9, among the plurality of thumbnail images 300A through 300D displayed on the display unit 30, there may be a thumbnail image 300B in which an object included in an image does not match an identification mark 310A through 310D as a result of incorrect recognition of an RIR in an image. In this case, a perspective transformation of the plurality of thumbnail images may be performed by using coordinate information saved in the memory 50. Accordingly, the better an identification mark corresponding to the coordinate information obtained in a thumbnail image matches an object included in the thumbnail image, the better the result of the image processing becomes.

However, when an RIR is incorrectly recognized in a plurality of thumbnail images and an object included in the thumbnail image does not match the identification mark, the coordinate information corresponding to the RIR which is incorrectly recognized is used to perform image processing of the plurality of thumbnail images for perspective transformation. For example, coordinate information corresponding to the incorrectly recognized RIR is used to set a matrix required for perspective transformation image processing, and therefore it is difficult to perform perspective transformation image processing according to the user's intention.

Accordingly, in order to generate a thumbnail image processed for perspective transformation according to the user's intention, the identification mark included in the thumbnail image needs to be corrected according to the object included in the image. In relation to this, the user may select the thumbnail image 300B in the display unit 30 in order to correct the identification mark 310B include in the thumbnail image 300B.

In this case, an edit image 400A for editing the thumbnail image 300B selected by the user is displayed on the display unit 30. The identification mark 410A displayed together with the edit image 400A is an enlarged version of the identification mark 310B included in the selected thumbnail image 300B. Accordingly, when an object included in the thumbnail image 300B does not match the identification mark 310B, the identification mark 410A displayed together in the edit image 400A does not match the object included in the edit image 400A, either.

In this case, as shown in FIG. 9, the identification mark 410A included in the edit image 400A may be corrected based on a user's input correspondingly to the object included in the edit image 400A. When the identification mark is corrected, corrected coordinate information corresponding to the identification mark 410B corrected in the edit image 400A is saved in the memory 50 with reference to the selected thumbnail image 300B.

For example, the corrected coordinate information corresponding to the corrected identification mark 410B may include coordinate information of pixels corresponding to each corner of the identification mark 410B corrected in the edit image 400A. In this case, both the original coordinate information and the corrected coordinate information may be saved together in the memory 50 with reference to the selected thumbnail image 300B. By doing so, when the corrected identification mark does not match well with an object included in an image in the future, correction of the identification mark may be performed again by using the original identification mark and/or coordinate information. More particularly, the corrected identification mark 410 may be displayed together in the edit image 400A and correspondingly to this the corrected identification mark 310E may also be displayed in the thumbnail image 300B selected by the user.

FIG. 10 is a schematic diagram showing an example of a user interface for perspective transformation, according to aspects of the disclosure. The electronic apparatus 100 may display on the display unit 30 a plurality of transformed thumbnail images and a transformed edit image obtained by performing image processing of a plurality of thumbnail images and an edit image for perspective transformation. For example, as shown in FIG. 10, it is difficult to say that perspective transformation for the plurality of transformed thumbnail images 500A and 500B and the transformed edit image 510A were performed as the intention of the user.

In this case, as shown in FIG. 10, the plurality of thumbnail images 300A and 300B and the edit image 400A which are images immediately before the perspective transformation may be displayed on the display unit 30 using the user interface 520A included in the transformed edit image 510A.

As shown in FIG. 10, when the identification mark 410A included in the edit image 400A does not match an object included in an image, a corrected identification mark 410B may be displayed on the edit image 400A based on a user input. Also, a corrected identification mark 310C may also be displayed in the thumbnail image 300B. In this case, the corrected coordinate information corresponding to the corrected identification mark 410B included in the edit image 400A may be associated with the thumbnail image 300B and saved in the memory 50.

Accordingly, the corrected coordinate information corresponding to the identification mark 410B corrected to more closely surround the object included in the edit image 400A may be used to perform perspective transformation of the thumbnail image 300B and the edit image 400A. Accordingly, as shown in FIG. 10, a plurality of transformed thumbnail images 500C and 500D and a transformed edit image 510B which are generated by performing image processing of the plurality of thumbnail images 300A and 300B and the edit image 400A for perspective transformation may be displayed on the display unit 30 based on the user input that is entered via the user interface 420A. In this case, as the corrected coordinate information used to perform the perspective transformation is corrected to match more closely the object included in the image, the plurality of transformed thumbnail images 500C and 500D and the transformed edit image 510B with higher quality may be displayed on the display unit 30.

Figure 11:
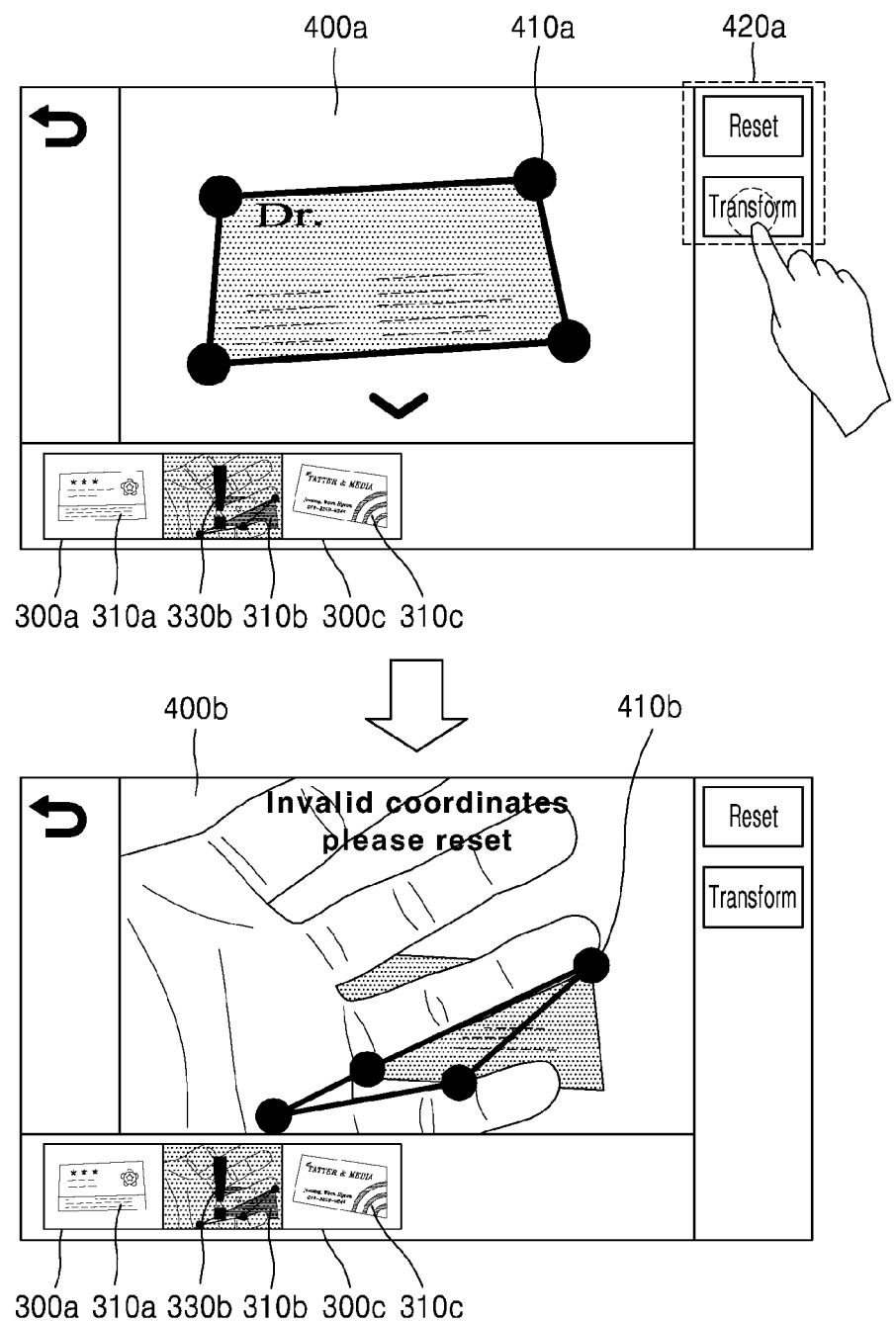
FIG. 11 is a schematic diagram showing an example of a user interface for editing of thumbnail images, according to aspects of the disclosure.

FIG. 11 is a schematic diagram showing an example of a user interface for editing of thumbnail images, according to aspects of the disclosure. In operation, by using coordinate information saved in the memory 50, the electronic apparatus 100 determines whether or not a plurality of identification marks displayed together with a plurality of thumbnail images are valid rectangular regions. For example, a valid rectangular region may be determined based on the values of parameters defining a rectangular region. In this case, the parameter values may include the size defining a rectangular region, the degree of distortion defining a rectangular region, the number of corners defining a rectangular region, and/or any other suitable type of parameter value.

For example, when it is determined in the image processing unit 60 that a plurality of identification marks included in a plurality of thumbnail images represent valid rectangular regions, the electronic apparatus 100 may apply a perspective transformation to the plurality of thumbnail images by using coordinate information saved in the memory 50 and display the resultant transformed images afterwards.

In some implementations, when it is determined in the image processing unit 60 that at least one of the plurality of identification marks displayed together with the plurality of thumbnail images is not a valid rectangular region, the electronic apparatus 100 may include a notice mark in the thumbnail image and display the thumbnail image together with the notice mark. According to aspects of the disclosure, the notice mark for a given thumbnail image can include any suitable type of indication that the identification mark of the thumbnail image is invalid.

Additionally or alternatively, as image processing of a plurality of thumbnail images for perspective transformation may be performed by using coordinate information corresponding to the identification mark, it is difficult to perform high quality perspective transformation when the identification mark detected in an image is not a valid rectangular region. Accordingly, before performing image processing of a plurality of thumbnail images all together, the electronic apparatus 100 according to the embodiment may inform in advance the user of the existence of a thumbnail image of which perspective transformation is not likely to be performed as user's intention, by using a notice mark.

Additionally or alternatively, in some implementations, in response to detecting that a particular identification mark is invalid, the electronic apparatus 100 may display on the display unit 30 a user interface for editing the identification mark. For example, an edit image for editing the thumbnail image including the identification mark which is not a valid rectangular region may be displayed. In this case, the identification mark included in the edit image may be corrected based on a user's input. Alternatively, in some implementations, the thumbnail image including an invalid rectangular region may be deleted based on the user's input.

When the identification mark is corrected, the electronic apparatus 100 may save the corrected coordinate information corresponding to the corrected identification mark in the memory 50 with reference to the thumbnail image 122. When the electronic apparatus 100 deletes based on the user's input the thumbnail image displayed on the display unit 30, the image corresponding to the thumbnail image saved in the memory 50 may also be deleted.

As shown in FIG. 11, a signal for performing perspective transformation image processing of the plurality of thumbnail images 300A through 300C and the edit image 400A displayed on the display unit 30 may be input through the user interface 420A displayed on the edit image 400A. In this case, it may be determined whether or not each identification mark 310A through 310C included in each of the plurality of thumbnail images 300A through 300C is a valid rectangular region.

As shown in FIG. 11, as the distortion degree of the rectangular region corresponding to the identification mark included in the thumbnail image 300B is big, it is determined that the rectangular region is not a valid one. In this case, the electronic apparatus 100 may display the thumbnail image 300B including the identification mark 310B which is determined to be an invalid rectangular region, together with a predetermined notice mark 330B.

In some implementations, before performing image processing of a plurality of thumbnail images all together for perspective transformation, the electronic apparatus 100 may inform in advance the user of the existence of an invalid identification mark in the thumbnail image. Additionally or alternatively, the edit image 400B for editing the thumbnail image 300B and/or the identification mark 310B may be displayed on the display unit 30. Afterwards, the identification mark 410B included in the edit image 400B may be corrected based on user input to the edit image.

Additionally or alternatively, in some implementations, when the identification mark 410B included in the edit image 400B cannot be corrected based on the user's input to satisfy the condition of a rectangular region, the thumbnail image 300B may be deleted from the display unit 30 based on the user's input. In this case, an image corresponding to the thumbnail image deleted in the display unit 30 may also be deleted in the memory 50.

Figure 12:
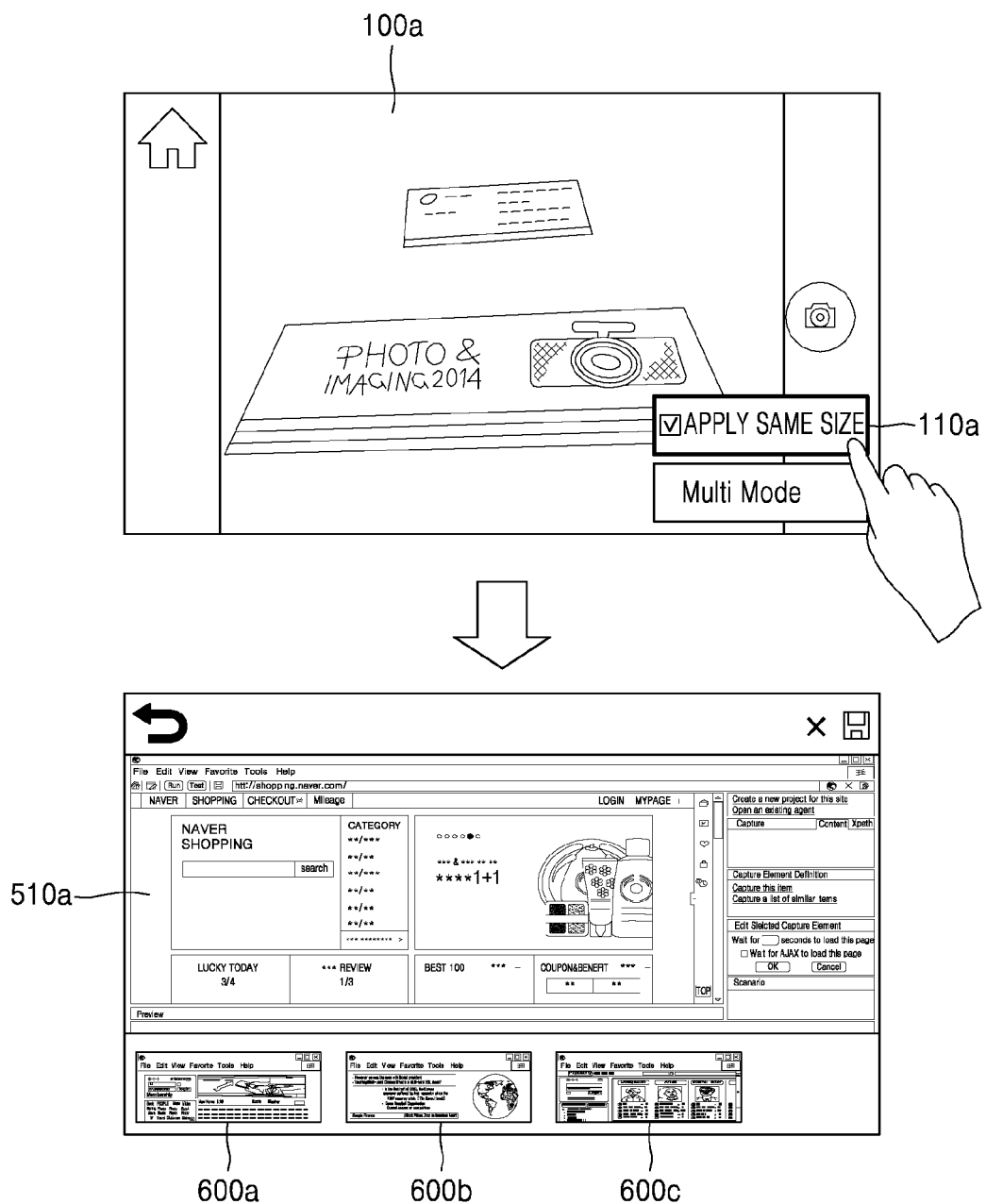
FIG. 12 is a schematic diagram showing an example of a user interface for resizing thumbnail images, according to aspects of the disclosure.

FIG. 12 is a schematic diagram showing an example of a user interface for resizing thumbnail images, according to aspects of the disclosure. When the view angles of a plurality of input images sequentially received are identical, it may be determined that a plurality of input images that belong to the same scene are being received. Additionally or alternatively, while a plurality of input images are sequentially received, if no motion is detected by the electronic apparatus 100 for a predetermined time period, it may be determined that a plurality of input images having an identical scene are being received. For example, if it is determined that a plurality of input images having an identical scene are being received, a plurality of thumbnail images may be resized to a predetermined size. In this case, the predetermined size may include a size corresponding to one input image included in the plurality of input images or a size that is specified by the user as default.

Additionally or alternatively, the size of a given thumbnail image may be determined based on the type of object that is depicted in the thumbnail image and surrounded by the thumbnail image's respective identification mark. For example, when the object depicted in the plurality of input images sequentially received is recognized as a business card, the size of the width or length of the plurality of thumbnail images may be adjusted to a ratio associated with business cards. As another example, when the object depicted in the plurality of input images sequentially received is recognized as an A4 document, the size of the width or length of the plurality of thumbnail images may be adjusted to a ratio associated with A4 documents'.

Accordingly, the electronic apparatus 100 displays on the display unit 30 a plurality of thumbnail images resized to a predetermined size and thus increases visibility or readability of the plurality of thumbnail images for the user. Also, if the plurality of thumbnail images are resized to a predetermined size, the plurality of input images saved in the memory 50 may also be resized to a predetermined size.

Additionally or alternatively, according to the embodiments described above, while a plurality of input images are being received, if there is a movement of the electronic apparatus 100 or if view angles of a plurality of input images sequentially received are not identical, it cannot be determined that a plurality of input images having an identical scene are being received in the electronic apparatus 100. However, for example, when there is no tripod to hold the electronic apparatus 100 and the user holds the electronic apparatus 100 with one hand to photograph class materials during class, there is still necessity for saving a plurality of input images sequentially received in a memory after resizing to an identical size. In this regard, in a live-view state which is before receiving a plurality of input images, the electronic apparatus 100 according to the embodiment may provide a user interface for the user to select in advance whether or not to resize a plurality of input images to be received later to an identical size when image processing is performed.

For example, as shown in FIG. 12, the electronic apparatus 100 may provide in a live-view state 100A a user interface 110A for a user to select in advance whether or not to resize to an identical size in image processing a plurality of input images to be received later. Accordingly, as shown in FIG. 12, even when a plurality of input images sequentially received later are not of an identical scene, a plurality of thumbnail images 600A through 600C resized to a predetermined size may be displayed on the display unit 30 based on a user's input. Additionally or alternatively, even when the electronic apparatus 100 continuously receives a plurality of images which are not of an identical scene, a user interface capable of displaying on the display unit 30 a plurality of thumbnail images resized to a predetermined size is provided and thus visibility or readability of the plurality of thumbnail images for a user is enhanced.

Figure 13:
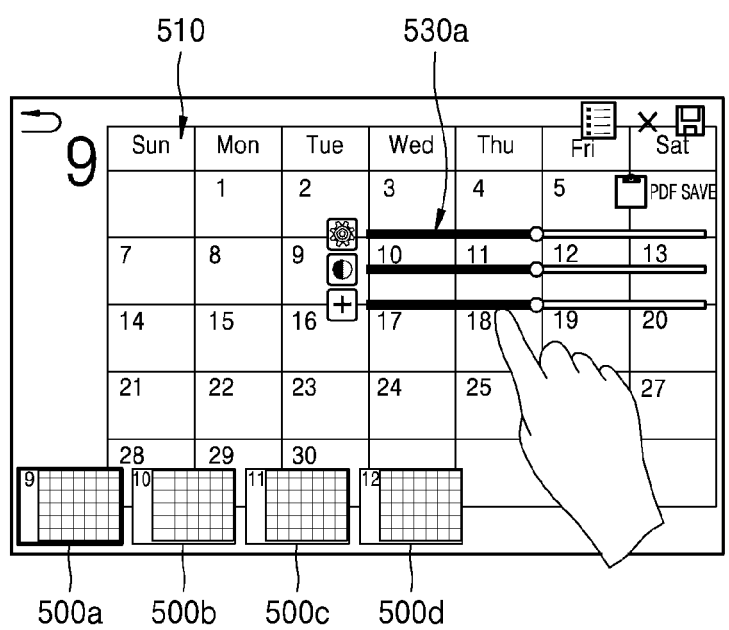
FIG. 13 is a schematic diagram showing an example in which an electronic apparatus post-processes a plurality of thumbnail images, according to aspects of the disclosure.

FIG. 13 is a schematic diagram showing an example in which an electronic apparatus post-processes a plurality of thumbnail images, according to aspects of the disclosure. As illustrated, the electronic apparatus 100 may perform image processing of a plurality of thumbnail images for perspective transformation and post-processing.

In this case, by performing image processing of a plurality of thumbnail images for perspective transformation and post-processing, the electronic apparatus 100 may perform image processing of a plurality of input images for perspective transformation and post-processing. For instance, the image processing for post-processing may include image signal processing for improving picture quality and may include adjustment of brightness level, color correction, contrast adjustment and outline emphasis adjustment.

As shown in FIG. 13, the electronic apparatus 100 may provide a user interface 530A for selecting image processing of a plurality of perspective transformed thumbnail images 500A through 500D and an edit image 510A. The user interface 530A may be for selecting the type of image signal processing for improving the picture quality of the plurality of perspective transformed thumbnail images 500A through 500D and the edit image 510A.

For example, the type of the image signal processing for improving picture quality may include adjustment of brightness level, color correction, contrast adjustment and outline emphasis adjustment. Accordingly, the electronic apparatus 100 may use the interface 530A to display on the display unit 30 a plurality of thumbnail image processed for post-processing and thus increase visibility or readability of the plurality of thumbnail images for the user.

Figure 14:
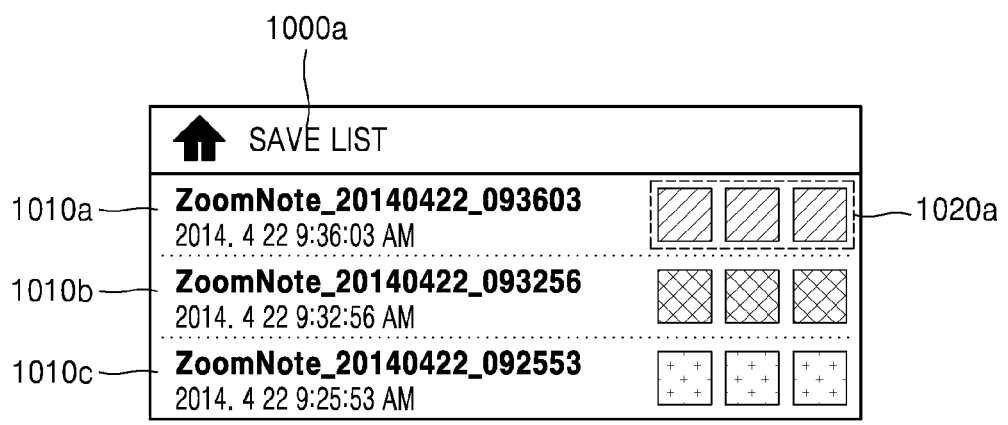
FIG. 14 is a schematic diagram showing an example in which an electronic apparatus displays information related to a plurality of transformed images together with categories in a category save list, according to aspects of the disclosure.
Figure 15:
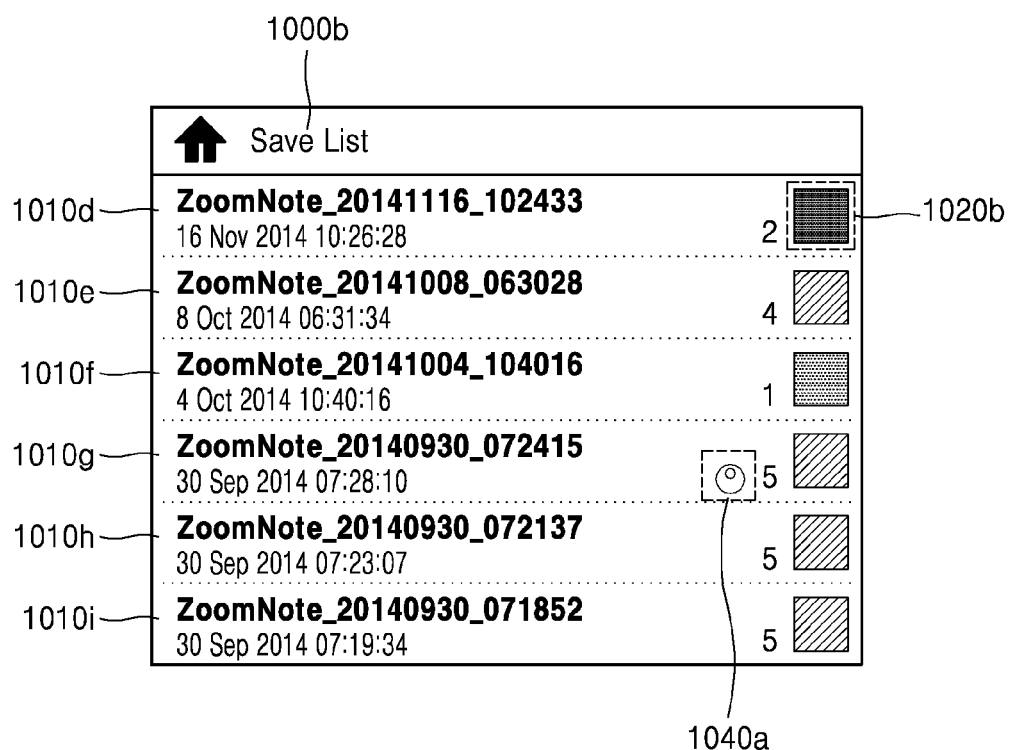
FIG. 15 is a schematic diagram showing an example in which an electronic apparatus displays information related to a plurality of transformed images together with categories in a category save list, according to aspects of the disclosure.

FIGS. 14 and 15 are schematic diagrams showing examples in which an electronic apparatus displays information related to a plurality of transformed images together with categories in a category save list, according to aspects of the disclosure.

After completing image processing of a plurality of input images, the electronic apparatus 100 may perform a process for generating a category corresponding to the receiving the plurality of input images sequentially received and saving and managing the plurality of input images by category. For example, the electronic apparatus 100 according to the embodiment may generate a category related to the receiving of a plurality of input images and save a plurality of transformed images related to the plurality of input images in the memory 50 with reference to the category. Also, information related to the plurality of transformed images may be displayed on the display unit 30 together with the category.

For example, a plurality of transformed images may be a plurality of input images sequentially received in the image receiving unit 10. Also, a plurality of transformed images may be a plurality of transformed images obtained by performing image processing of a plurality of input images altogether for perspective transformation. Also, information related to the plurality of transformed images may include at least one of the number of a plurality of transformed images included in a category and thumbnail images corresponding to the plurality of transformed images.

As shown in FIGS. 14 and 15, when sequentially receiving a plurality of input images, the electronic apparatus 100 may generate a category corresponding to the receiving of the plurality of input images.

Additionally or alternatively, a plurality of transformed images obtained by completing a predetermined image processing of a plurality of input images may be saved by category. In this case, based on a user's input, the electronic apparatus 100 may display on the display unit 30 the list of category 1000A and 1000B saving the plurality of transformed images. As shown in FIG. 14, the name of each category 1010A through 1010C and a plurality of thumbnail images 1020A corresponding to a plurality of transformed images saved in each category may be displayed together in the category list 1000A.

In addition, as shown in FIG. 15, the name of each category 1010D through 1010I and a thumbnail image 1020B corresponding to a representative image among a plurality of transformed images saved in each category may be displayed together in the category list 1000B. An icon 1030A indicating the number of a plurality of transformed images saved in each category may also be displayed together in the category list 1000B. Furthermore, as shown in FIG. 15, when voice data, as well as image data, is saved in the category 1010G, an icon 1040A of a speaker may be displayed together. Accordingly, when displaying a category list saving a plurality of transformed images, the electronic apparatus 100 may also display information related to the saved plurality of transformed images, thus enhancing convenience for a user to confirm and manage the plurality of transformed images.

Figure 16:
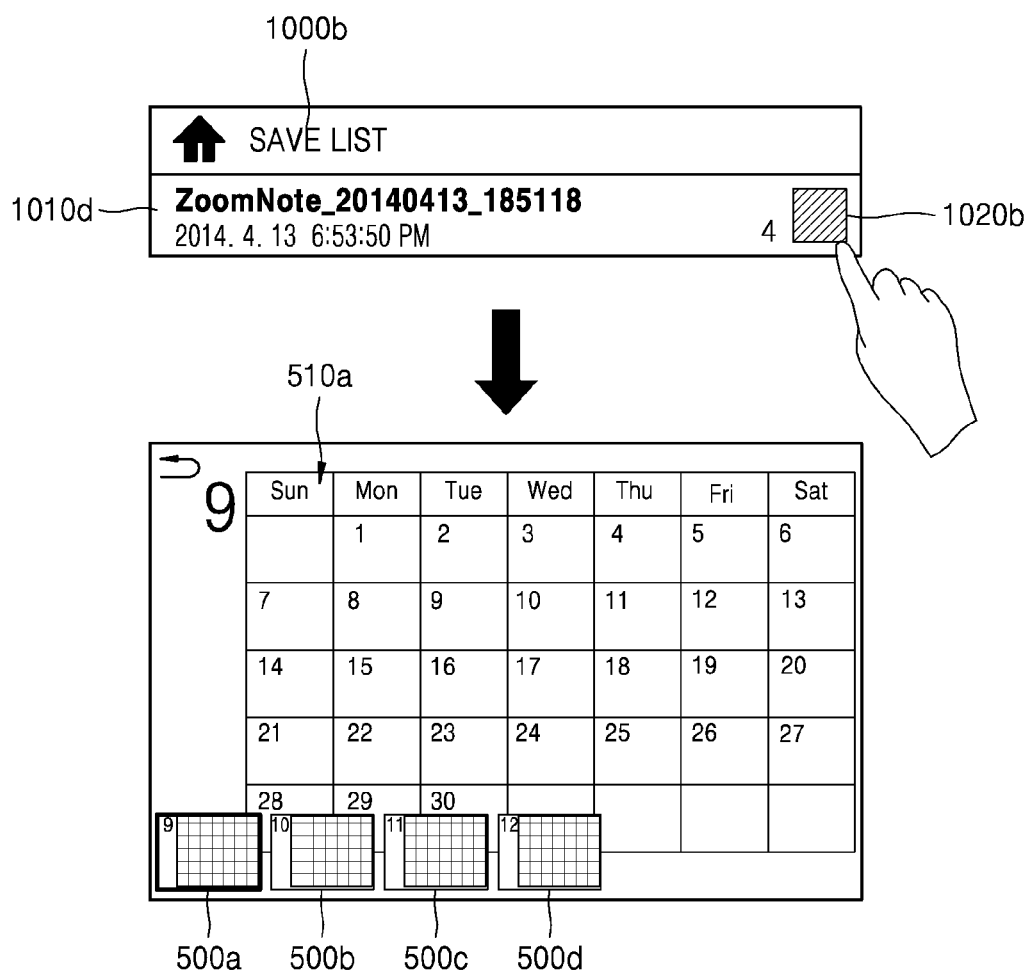
FIG. 16 is a schematic diagram showing an example of a category save list, according to aspects of the disclosure.

FIG. 16 is a schematic diagram showing an example of a category save list, according to aspects of the disclosure. As shown in FIG. 16, the name of each category 1010D through 1010I and a thumbnail image 1020B corresponding to a representative image among a plurality of transformed images saved in each category may be displayed together in the category list 100B. In this case, when the thumbnail image 1020B displayed in the category list 1000B is selected based on a user's input, the plurality of transformed images saved in the category with the category name 1010D may be displayed on the display unit 30. As shown in FIG. 16, a plurality of thumbnail images 500A through 500D corresponding to the plurality of transformed images may be displayed on the display unit 30 together with an image 510A obtained by enlarging the thumbnail image 500A displayed in the category list 1000B.

Figure 17:
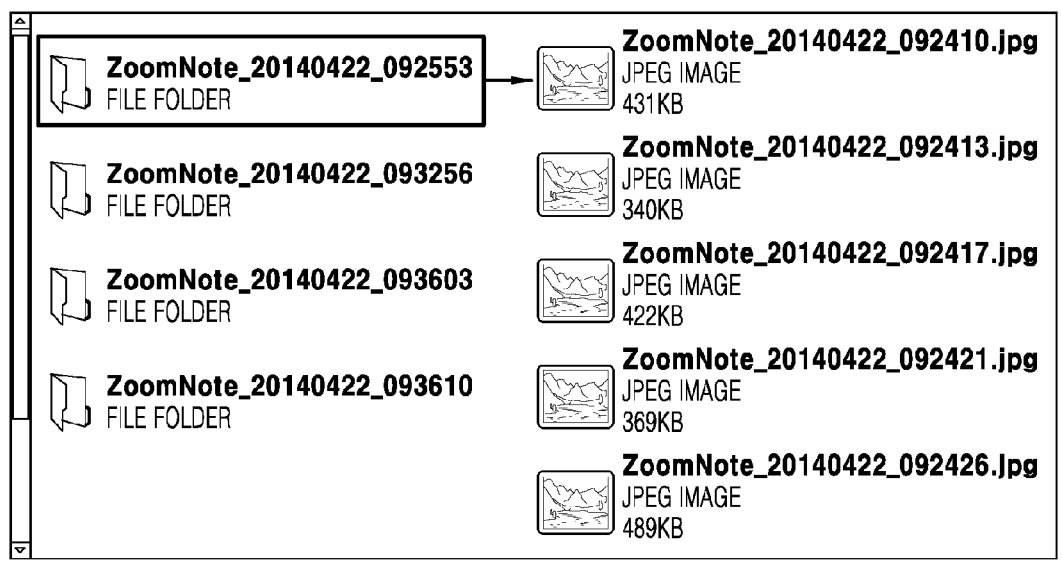
FIG. 17 is a schematic diagram showing an example in which a plurality of transformed images saved in an external memory of an electronic apparatus are checked in a display unit of an external apparatus, according to aspects of the disclosure.

FIG. 17 is a schematic diagram showing an example in which a plurality of transformed images saved in an external memory of an electronic apparatus are checked in a display unit of an external apparatus, according to aspects of the disclosure. As shown in FIG. 17, when a category saved in a memory 50 of a display unit of an external apparatus which is not the electronic apparatus 100 is displayed, a plurality of images included in each category may be displayed as individual files such as files of PDF, DOC and PPT types.

Accordingly, the electronic apparatus 100 according to the embodiment enables the user to easily manage a plurality of images all together and save and manage images by category.

The device described herein may comprise a processor, a memory for storing program data and executing it, a permanent storage such as a disk drive, a communications port for handling communications with external devices, and user interface devices, including a display, keys, etc.

When software modules are involved, these software modules may be stored as program instructions or computer-readable codes executable on the processor on a computer-readable media such as read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art.

The present disclosure may be described in terms of functional block components and various processing steps. Such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices. Similarly, where the elements of the present disclosure are implemented using software programming or software elements the disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present disclosure could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the disclosure unless the element is specifically described as "essential" or "critical".

The use of the terms "a" and "an" and "the" and similar referents in the context of describing the disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those skilled in this art without departing from the spirit and scope of the present disclosure.

FIGS. 1-8 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," "in this case," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. A method for image processing by an electronic device comprising:
   detecting a rectangular image region (RIR) in one of a plurality of images while the plurality of images is being received;
   obtaining a coordinate corresponding to the detected RIR;
   storing in a memory the coordinate and a first link associating the coordinate with the image in which the RIR is detected;
   determining a first view angle of the image in which the RIR is detected;
   determining whether the first view angle is substantially identical to a second view angle of another of the plurality of images; and
   when the first view angle is substantially identical to the second view angle, storing a second link associating the coordinate with the another of the plurality of images,
   wherein the determination of whether the first view angle is substantially identical to the second view angle is based at least on one of:
      a comparison of a first focal length of the image in which the RIR is detected and a second focal length of the another of the plurality of images, and
      a determination that the electronic device has not moved for a predetermined time period.

2. The method of claim 1, further comprising:
   generating a plurality of thumbnail images based on the coordinate and the plurality of images, each of the thumbnail images including an identification mark that is generated based on the coordinate; and
   displaying on a display unit the plurality of thumbnail images.

3. The method of claim 2, further comprising enlarging a selected thumbnail image to generate an enlarged thumbnail image, and displaying the enlarged thumbnail image together with the plurality of thumbnail images.

4. The method of claim 2, further comprising presenting a user interface for editing the plurality of thumbnail images.

5. The method of claim 4, wherein the user interface is for editing the respective identification mark of any one of the plurality of images.

6. The method of claim 4, wherein the user interface is for performing a perspective transformation on at least one of the plurality of thumbnail images.

7. The method of claim 4, wherein the user interface is for resizing at least one of the plurality of thumbnail images.

8. The method of claim 1, further comprising:
   transforming the plurality of images based on the coordinate to generate a plurality of transformed images;
   assigning a category to the transformed images; and
   displaying, on a display unit, information related to the transformed images together with an indication of the category.

9. The method of claim 8, wherein the information related to the transformed images comprises at least one of a count of the plurality of transformed images and thumbnail images corresponding to the transformed images.

10. An electronic device comprising a display unit, a memory, and one or more processors configured to:
    detect a rectangular image region (RIR) in one of a plurality of images while the plurality of images is being received;
    obtain a coordinate corresponding to the detected RIR;
    store, in the memory, the coordinate and a first link associating the coordinate with the image in which the RIR is detected;
    determining a first view angle of the image in which the RIR is detected;
    determining whether the first view angle is substantially identical to a second view angle of another of the plurality of images; and
    when the first view angle is substantially identical to the second view angle, storing a second link associating the coordinate with the another of the plurality of images,
    wherein the determination of whether the first view angle is substantially identical to the second view angle is based at least on one of:
       a comparison of a first focal length of the image in which the RIR is detected and a second focal length of the another of the plurality of images, and
       a determination that the electronic device has not moved for a predetermined time period.

11. The electronic device of claim 10, wherein the one or more processors are further configured to:
    generate a plurality of thumbnail images based on the coordinate and the plurality of images, each of the thumbnail images including an identification mark that is generated based on the coordinate; and
    display the plurality of thumbnail images on the display unit.

12. The electronic device of claim 11, wherein the one or more processors are further configured to enlarge a selected thumbnail image to generate an enlarged thumbnail image, and display the enlarged thumbnail image together with the plurality of thumbnail images.

13. The electronic device of claim 11, wherein the one or more processors are further configured to present a user interface for editing the plurality of thumbnail images.

14. The electronic device of claim 13, wherein the user interface is for editing the respective identification mark of any one of the plurality of images.

15. The electronic device of claim 13, wherein the user interface is for performing a perspective transformation on at least one of the plurality of thumbnail images.

16. The electronic device of claim 13, wherein the user interface is for resizing at least one of the plurality of thumbnail images.

17. The electronic device of claim 10, wherein the one or more processors are further configured to:
    transform the plurality of images based on the coordinate to generate a plurality of transformed images;
    assign a category to the transformed images; and
    display, on the display unit, information related to the transformed images together with an indication of the category.

18. The electronic device of claim 17, wherein the information related to the transformed images comprises at least one of a count of the plurality of transformed images and thumbnail images corresponding to the transformed images.

19. A non-transitory computer-readable medium of an electronic device storing processor-executable instructions, which when executed by the processor cause the processor to perform a method comprising the steps of:
    detecting a rectangular image region (RIR) in one of a plurality of images while the plurality of images is being received;
    obtaining a coordinate corresponding to the detected RIR;
    storing, in a memory, the coordinate and a first link associating the coordinate with the image in which the RIR is detected;

determining a first view angle of the image in which the RIR is detected;

determining whether the first view angle is substantially identical to a second view angle of another of the plurality of images; and when the first view angle is substantially identical to the second view angle, storing a second link associating the coordinate with the another of the plurality of images, wherein the determination of whether the first view angle is substantially identical to the second view angle is based at least on one of:

- a comparison of a first focal length of the image in which the RIR is detected and a second focal length of the another of the plurality of images, and
- a determination that the electronic device has not moved for a predetermined time period.

20. The non-transitory computer-readable medium of claim 19, wherein the method further comprises the steps of:

transforming the plurality of images based on the coordinate to generate a plurality of transformed images;

assigning a category to the transformed image; and displaying, on a display unit, information related to the transformed images together with an indication of the category.

* * * * *